United States Patent
Sohn et al.

(10) Patent No.: US 10,287,434 B2
(45) Date of Patent: *May 14, 2019

(54) POLYMER RESIN COMPOSITION HAVING EXCELLENT CHEMICAL RESISTANCE

(71) Applicant: SK CHEMICALS CO., LTD., Gyeonggi-do (KR)

(72) Inventors: Dong-Cheol Sohn, Gyeonggi-do (KR); Tae-Woong Lee, Gyeonggi-do (KR); Jong-Wook Shin, Gyeonggi-do (KR)

(73) Assignee: SK Chemicals, Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/897,752

(22) PCT Filed: Jun. 11, 2014

(86) PCT No.: PCT/KR2014/005125
§ 371 (c)(1),
(2) Date: Dec. 11, 2015

(87) PCT Pub. No.: WO2014/200263
PCT Pub. Date: Dec. 18, 2014

(65) Prior Publication Data
US 2016/0137834 A1 May 19, 2016

(30) Foreign Application Priority Data
Jun. 11, 2013 (KR) .......................... 10-2013-0066771

(51) Int. Cl.
*C08L 67/02* (2006.01)
*C08L 51/00* (2006.01)
*C08L 55/02* (2006.01)
*C08L 69/00* (2006.01)

(52) U.S. Cl.
CPC .......... *C08L 67/025* (2013.01); *C08L 51/00* (2013.01); *C08L 55/02* (2013.01); *C08L 67/02* (2013.01); *C08L 69/00* (2013.01); *C08L 2205/02* (2013.01); *C08L 2205/035* (2013.01); *C08L 2205/06* (2013.01); *C08L 2205/08* (2013.01); *C08L 2207/53* (2013.01)

(58) Field of Classification Search
CPC ........ C08L 67/02; C08L 67/025; C08L 69/00; C08L 51/00; C08L 55/02; C08L 2207/53; C08L 2205/02; C08L 2205/035; C08L 2205/06; C08L 2205/08
See application file for complete search history.

(56) References Cited

U.S. PATENT DOCUMENTS

| | | | |
|---|---|---|---|
| 4,713,415 A * | 12/1987 | Lavengood | C08L 25/12 525/183 |
| 5,371,142 A | 12/1994 | Nishikubo et al. | |
| 5,910,538 A * | 6/1999 | Padwa | C08L 51/04 525/67 |
| 6,140,422 A | 10/2000 | Khanarian et al. | |
| 6,359,070 B1 | 3/2002 | Khanarian et al. | |
| 6,599,966 B2 * | 7/2003 | Penning | C08K 5/50 524/156 |
| 6,656,577 B1 * | 12/2003 | Adelman | C08G 63/672 264/176.1 |
| 6,914,120 B2 | 7/2005 | Germroth et al. | |
| 7,067,567 B2 * | 6/2006 | Seidel | C08K 5/0066 523/201 |
| 2008/0119596 A1 | 5/2008 | Agarvval et al. | |
| 2009/0062412 A1 | 3/2009 | Eipper et al. | |
| 2009/0286062 A1 * | 11/2009 | Vaze | C08L 67/02 428/220 |
| 2010/0222476 A1 * | 9/2010 | Avakian | C08L 67/02 524/133 |

(Continued)

FOREIGN PATENT DOCUMENTS

| CN | 1298426 | 6/2001 |
|---|---|---|
| CN | 101113231 | 1/2008 |

(Continued)

OTHER PUBLICATIONS

Brunelle, D.J.; Encyclopedia of Polymer Science and Technology: Polycarbonates, 2006, p. 1-33.*
Gallucci, R.R., et al.; Modern Polyesters: Chemistry and Technology of Polyesters and Copolyesters: Poly(Butylene Terephthalate), 2003, p. 293-321.*
International Search Report prepared by the Korean International Property Office dated Sep. 25, 2014, for International Application No. PCT/KR2014/005125.
Extended European Search Report for European Patent Application No. 14811078.6, dated Nov. 17, 2016, 6 pages.
International Search Report and Written Opinion prepared by the Korean International Property Office dated Sep. 25, 2014, for International Application No. PCT/KR2014/005126, 9 pages.

(Continued)

*Primary Examiner* — Robert S Jones
(74) *Attorney, Agent, or Firm* — Sheridan Ross P.C.

(57) ABSTRACT

The present invention relates to a polymer resin composition that is capable of providing an environmentally friendly biomass-containing synthetic resin having improved chemical resistance. The present invention provides a polymer resin composition including: a polyester copolymer including a residue of a dicarboxylic acid component containing terephthalic acid, and a residue of a diol component including dianhydrohexitol; and one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer, and which has a tensile strength loss defined in the following Equation 1 ranging from 0.5 to 30%.

Tensile Strength Loss (%)=[(Tensile Strength before Test−Tensile Strength after Test)/Tensile Strength before Test]×100     [Equation 1]

13 Claims, No Drawings

(56) References Cited

U.S. PATENT DOCUMENTS

| | | | |
|---|---|---|---|
| 2012/0271004 A1* | 10/2012 | Quinebeche | B29C 47/385 |
| | | | 525/190 |
| 2014/0187717 A1 | 7/2014 | Kwon et al. | |
| 2016/0122536 A1 | 5/2016 | Sohn et al. | |

FOREIGN PATENT DOCUMENTS

| | | |
|---|---|---|
| CN | 101208388 | 6/2008 |
| CN | 102325840 | 1/2012 |
| EP | 2907851 | 8/2015 |
| EP | 2955204 | 12/2015 |
| JP | 10-087971 A | 4/1998 |
| JP | 2012-224666 | 11/2012 |
| JP | 2013-082942 | 5/2013 |
| JP | 2014-001293 | 1/2014 |
| KR | 10-1999-0065669 A | 8/1999 |
| KR | 10-2005-0088661 A | 9/2005 |
| KR | 10-2010-0073792 A | 7/2010 |
| KR | 10-2012-0114507 A | 10/2012 |
| KR | 10-2013-0044867 A | 5/2013 |
| KR | 10-2013-0055219 A | 5/2013 |
| KR | 10-2014-0100301 A | 8/2014 |
| WO | WO 99/54399 | 10/1999 |
| WO | WO 00/04094 | 1/2000 |
| WO | WO 2011007093 A1 * | 1/2011 ............. C08L 67/04 |
| WO | WO 2011-016373 A1 | 2/2011 |
| WO | WO 2014/061429 | 4/2014 |
| WO | WO 2015/194812 | 12/2015 |

OTHER PUBLICATIONS

Official Action for U.S. Appl. No. 14/897,774, dated Nov. 14, 2016 15 pages.

Official Action for U.S. Appl. No. 14/897,774, dated May 18, 2017 14 pages.

* cited by examiner

POLYMER RESIN COMPOSITION HAVING EXCELLENT CHEMICAL RESISTANCE

CROSS REFERENCE TO RELATED APPLICATIONS

This application is a national stage application under 35 U.S.C. 371 and claims the benefit of PCT Application No. PCT/KR2014/005125 having an international filing date of Jun. 11, 2014, which designated the United States, which PCT application claimed the benefit of Korean Patent Application No. 10-2013-0066771 filed Jun. 11, 2013, the disclosures of each of which are incorporated herein by reference.

TECHNICAL FIELD

The present invention relates to a polymer resin composition, and more particularly, to a polymer resin composition that is capable of providing an environmentally friendly biomass-containing synthetic resin exhibiting improved chemical resistance.

BACKGROUND OF ART

Polyester resins are widely used for reinforced plastics, paints, films, resins for molding, and the like due to their relatively excellent characteristics such as heat resistance, mechanical strength, and elastic strength. Also, the polyester resins are used as fiber materials for clothing.

Recently, these polyester resins have been increasingly used in the fields of interior building materials, plastic sign boards, and the like due to their characteristic properties. However, the polyester resins have low heat resistance as compared with other polymer materials, e.g., acrylate-based materials or polycarbonate-based materials. Thus, there were problems in that they were not suitable for exterior materials that should be able to withstand severe temperature changes every season.

Meanwhile, polycarbonate resins have excellent physical properties such as impact resistance or heat resistance and thus have been used in a variety of fields including the exteriors of many building materials and electronic products, packaging materials, cases, boxes, and interior or exterior materials for interior design. These polycarbonate resins have been in great demand due to their good mechanical properties, yet there were problems in that, due to various detergents, female cosmetics, and children's hand sanitizers commonly used in the community, the appearance or color of the polycarbonates either changed or cracks were generated, and the deterioration of the product may be caused by a variety of chemicals used in daily life.

Various attempts have been conducted to solve the problems encountered with the polyester resins and the polycarbonate resins. Also, studies for the blending of the polyester resins and the polycarbonate resins are still being conducted.

Moreover, a technique of blending the polycarbonate resins with an acrylonitrile-butadiene-styrene (ABS)-based graft copolymer or the like to improve its impact resistance and heat resistance has been developed. However, there was a limitation that this is not directed to an environmentally friendly biomass product. On the other hand, since the polyester resins and the polycarbonate resins have different melt viscosity and molecular structures, there was a limitation in that these components are simply blended to improve heat resistance. Further, various methods have been proposed to enhance the chemical resistance of the polycarbonates while maintaining their mechanical and physical properties, particularly heat resistance thereof, however, the degree of improving the chemical resistance has not been sufficient for application in practical industries and the appearance characteristics of the resulting products deteriorate. In addition, a method of further blending the polycarbonate resin with one or more additional materials has been tried to simultaneously improve heat resistance and chemical resistance. However, it was difficult to obtain a suitable level of chemical resistance.

On the other hand, generally, acrylonitrile-butadiene-styrene (ABS) or polycarbonate/ABS (PC/ABS) has been increasingly used as an engineering plastic, and the PC/ABS has been developed for the purpose of utilizing the heat resistance, impact resistance and the self-extinguishing property of PC and the processability and economic advantage of the ABS. However, this PC/ABS has poor resistance to chemicals, particularly some chemicals such as aromatic hydrocarbons, acetone, and alcohols, from which discoloration, swelling, and cracks may occur by direct contact with the above-mentioned chemicals over a long period, thereby losing product value. Accordingly, numerous studies for preparing a resin composition having superior resistance to chemicals over the conventional heat-resistant ABS or the PC/ABS have been conducted. For example, in order to improve the chemical resistance of ABS, it has been reported that a polyolefin-based resin having good chemical resistance may be mixed with the ABS. However, this needs a block copolymer as a compatibilizer for improving the compatibility of incompatible materials. Further, it is difficult to be practically applied because phase separation occurs and the mechanical property rapidly deteriorates.

DETAILED DESCRIPTION OF THE INVENTION

Technical Problem

The present invention provides a polymer resin composition capable of providing an environmentally friendly biomass-containing synthetic resin exhibiting improved chemical resistance while exhibiting excellent impact resistance and heat resistance.

Technical Solution

The present invention provides a polymer resin composition including: a polyester copolymer including a residue of a dicarboxylic acid component containing terephthalic acid, and a residue of a diol component containing dianhydrohexitol; and one or more copolymers selected from the group consisting of an unsaturated nitrile-diene-based rubber-aromatic vinyl graft copolymer, an alkyl methacrylate-diene-based a rubber-aromatic vinyl graft copolymer, and an alkyl methacrylate-silicone/alkyl acrylate graft copolymer, and having a tensile strength loss defined in the following Equation 1 ranging from 0.5 to 30%.

Tensile Strength Loss (%)=[(Tensile Strength before Test−Tensile Strength after Test)/Tensile Strength before Test]×100  [Equation 1]

The polymer resin composition may include the polyester copolymer in an amount of 5 to 90% by weight, and the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer in an amount of 1 to 50% by weight.

The polymer resin composition may further include a polycarbonate in an amount of 5 to 90% by weight.

The polymer resin composition may further include polybutylene terephthalate in an amount of 1 to 30% by weight.

The polymer resin composition may further include a styrene-ethylene-butylene-styrene block copolymer in an amount of 1 to 20% by weight.

The polyester copolymer may have a weight average molecular weight of 10,000 to 100,000, and a glass transition temperature of 0 to 200° C.

In the polyester copolymer, the dicarboxylic acid component may further include one or more selected from the group consisting of aromatic dicarboxylic acids having 8 to 20 carbon atoms and aliphatic dicarboxylic acids having 4 to 20 carbon atoms.

In the polyester copolymer, the dianhydrohexitol may be isosorbide.

Further, in the polyester copolymer, the dianhydrohexitol may be contained in an amount of 5 to 60 mol % based on the total amount of the diol component.

In the polyester copolymer, the diol component may further include one or more selected from the group consisting of compounds of Chemical Formulas 1, 2, and 3:

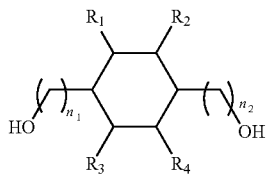

[Chemical Formula 1]

wherein $R_1$, $R_2$, $R_3$, and $R_4$ are each independently hydrogen or a substituted or unsubstituted alkyl group having 1 to 5 carbon atoms, and $n_1$ and $n_2$ are each independently an integer of 0 to 3,

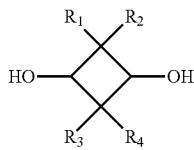

[Chemical Formula 2]

wherein $R_1$, $R_2$, $R_3$, and $R_4$ are each independently hydrogen or a substituted or unsubstituted alkyl group having 1 to 5 carbon atoms,

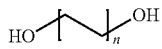

[Chemical Formula 3]

wherein n is an integer of 1 to 7.

On the other hand, in the polyester copolymer, the diol component may further include 1,4-cyclohexanediol and ethylene glycol.

The unsaturated nitrile-diene-based rubber-aromatic vinyl graft copolymer may be in the form of a core-shell rubber and have an average particle diameter of 0.01 to 5 μm and a graft rate of 5 to 90%, and the core may have a glass transition temperature of −20° C. or less and the shell may have a glass transition temperature of 20° C. or more.

In the unsaturated nitrile-diene-based rubber-aromatic vinyl graft copolymer, the unsaturated nitrile may be one or more selected from the group consisting of acrylonitrile, methacrylonitrile, ethacrylonitrile, phenyl acrylonitrile, and α-chloroacrylonitrile.

In the graft copolymer, the diene-based rubber may be a butadiene-type rubber or an isoprene-type rubber.

Furthermore, in the graft copolymer, the aromatic vinyl may be one or more selected from the group consisting of styrene, α-methyl styrene vinyl toluene, t-butyl styrene, halogen-substituted styrene, 1,3-dimethyl styrene, 2,4-dimethyl styrene, and ethyl styrene.

The unsaturated nitrile-diene-based rubber-aromatic vinyl graft copolymer may be an acrylonitrile-butadiene-styrene graft copolymer.

The alkyl methacrylate-diene-based rubber-aromatic vinyl graft copolymer may be a methyl methacrylate-butadiene-styrene graft copolymer.

The alkyl methacrylate-silicone/alkyl acrylate graft copolymer may be a methyl methacrylate-silicone/butylacrylate graft copolymer.

The polycarbonate may have a glass transition temperature of 50 to 200° C., and a weight average molecular weight of 10,000 to 200,000.

The polybutylene terephthalate may have a weight average molecular weight of 10,000 to 150,000.

The polymer resin composition may further include one or more selected from the group consisting of an unsaturated nitrile-aromatic vinyl-glycidyl methacrylate-based compatibilizer, an unsaturated nitrile-aromatic vinyl-maleic anhydride-based compatibilizer, a saturated ethylene-alkylacrylate-glycidyl methacrylate-based compatibilizer, and a carbodiimide-based anti-hydrolysis agent.

The polymer resin composition may include one or more additives selected from the group consisting of an antioxidant, a lubricant, a light stabilizer, a light absorber, an inhibitor of transesterification, and an anti-hydrolysis agent in an amount of 10% by weight or less based on the total weight of the composition.

Advantageous Effects

According to the present invention, a polymer resin composition capable of providing an environmentally friendly biomass-containing synthetic resin exhibiting improved chemical resistance while exhibiting excellent impact resistance and heat resistance, and a synthetic resin and a resin molding article obtained by using the same, can be provided.

DETAILED DESCRIPTION OF THE EMBODIMENTS

The present invention may include several embodiments including various changes or modifications and will be described in detail with reference to particular embodiments. However, it should be understood by those skilled in the art that it is not intended to limit the present invention to the particular embodiments, and various changes, equivalences, and modifications may be made to the invention without departing from the spirit and scope of the invention. In the present disclosure, the specific description of the related prior arts may be omitted if it renders the features of the present invention vague.

The present invention provides a polymer resin composition including: a polyester copolymer including a residue of a dicarboxylic acid component containing terephthalic acid, and a residue of a diol component containing dianhydrohexitol; and one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer, and having a tensile strength loss defined in the following Equation 1 ranging from 0.5 to 30%.

Tensile Strength Loss (%)=[(Tensile Strength before Test−Tensile Strength after Test)/Tensile Strength before Test]×100 [Equation 1]

Hereinafter, the polymer resin composition according to particular embodiments of the present invention will be described in detail.

One embodiment of the present invention provides a polymer resin composition including: a polyester copolymer including a residue of a dicarboxylic acid component containing terephthalic acid, and a residue of a diol component containing dianhydrohexitol; and one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer, and having a tensile strength loss defined in the following Equation 1 ranging from 0.5 to 30%.

Tensile Strength Loss (%)=[(Tensile Strength before Test−Tensile Strength after Test)/Tensile Strength before Test]×100 [Equation 1]

The tensile strengths before and after test are measured as follows.

The above-described polymer resin composition is uniformly kneaded and extruded. The pellets thus prepared are injected at a temperature of 250° C. using an injection molding machine in the same manner, and the injected samples for testing tensile strength are subjected to their conditioning for 24 h under the conditions of 23±2° C. and relative humidity 50±5%. The above test samples are fixed in a chemical resistance test fixture in which a critical amount of deformation is set to 2.2%. Thereafter, the test samples are applied with a blend of aromatic/aliphatic chemical reagents or a UV screening agent for 1 min and then left at 23±2° C. for 72 h. Then, the tensile strengths before and after the test are measured. However, the blend of aromatic/aliphatic chemicals includes 10% to 90 by weight of ethanol and 90 to 99% by weight of polyols, and further includes one or adjunctive components selected from the group consisting of aliphatic and aromatic alcohols, aliphatic and aromatic esters, aromatic aldehydes, unsaturated hydrocarbons, saturated hydrocarbons, aliphatic amines, aliphatic diamines, and terpenes. In the case of the polyol base, only an adjunctive component of aliphatic amines or diamines is included.

Conventionally, a technique of blending the polycarbonate resins with an acrylonitrile-butadiene-styrene (ABS)-based graft copolymer or the like to improve the impact resistance and heat resistance has been developed. However, there was a limitation that it fails to obtain good resistance to chemicals or resistance to environmental stress cracks, and is not directed to an environmentally friendly biomass product.

Accordingly, the present inventors conducted extensive research to develop an environmentally friendly resin composition having good heat resistance or impact resistance and improved resistance to chemicals or resistance to environmental stress cracks, and found through experiments that a polymer resin composition including a particular polyester copolymer, and one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer can have properties of heat resistance or impact resistance and exhibit improved resistance to chemicals or resistance to environmental stress cracks.

The tensile strength loss may be measured by the following method.

The polymer resin composition according to the present invention is subjected to uniform kneading and extruding to prepare pellets, and the pellets are injected at a temperature of 250° C. in the same manner, the injected samples for testing tensile strength are subjected to their conditioning for 24 h under the conditions of 23±2° C. and relative humidity 50±5%. The above test samples are fixed in the chemical resistance test fixture in which a critical amount of deformation is set to 2.2%. Subsequently, the test samples are applied with a blend of aromatic/aliphatic chemical reagents or a UV screening agent for 1 min and then left at 23±2° C. for 72 h. Thereafter, the test samples are measured for tensile strength before and after testing to calculate a tensile strength loss (%), thereby evaluating and comparing a degree of chemical resistance.

The blend of aromatic/aliphatic chemical reagents includes 10 to 90% by weight of ethanol and 90 to 99% by weight of polyols, and further includes one or more adjunctive components selected from the group consisting of aliphatic and aromatic alcohols, aliphatic and aromatic esters, aromatic aldehydes, unsaturated hydrocarbons, saturated hydrocarbons, aliphatic amines, aliphatic diamines, and terpenes. In the case of the polyol base, only an adjunctive component of aliphatic amines or diamines is included.

The tensile strength loss is calculated by the following Equation 1 and represented by "%".

Tensile Strength Loss (%)=[(Tensile Strength before Test−Tensile Strength after Test)/Tensile Strength before Test]×100 [Equation 1]

As mentioned above, the chemical resistance of the polymer resin composition becomes better as tensile strength after test loss (%) is lowered.

In the course of preparing the above-described polymer resin composition, conventional methods and apparatuses used for preparing a blend or a mixture of the polymer resins can be used without particular limitation. For example, the polymer resin composition may be prepared by introducing a polyester copolymer and one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer in a conventional blender, mixer, or tumbler, and then mixing them through a twin-screw kneading extruder. In the course of preparing the above-described polymer resin composition, each of the resins is preferably used in its dried state.

The polymer resin composition may include the polyester copolymer in an amount of 5 to 90% by weight, and the one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer in an amount of 1 to 50% by weight.

Also, the polymer resin composition may further include a polycarbonate in an amount of 5 to 90% by weight.

The polymer resin composition may further include polybutylene terephthalate in an amount of 1 to 30% by weight to improve the resistance to chemicals or resistance to environmental stress cracks thereof.

The polymer resin composition may further include a styrene-ethylene-butylene-styrene block copolymer in an amount of 1 to 20% by weight to improve the resistance to chemicals or resistance to environmental stress cracks thereof, and more.

As used herein, the term "residue" refers to a certain part or unit which is included within the resultant from the chemical reaction of particular compounds and which are derived from the particular compounds. For example, the "residue" of the dicarboxylic acid component and the "residue" of the diol component are the parts derived from the dicarboxylic acid component and from the diol component, respectively, in polyester formed from esterification or polycondensation.

As used herein, the term "dicarboxylic acid component" refers to including dicarboxylic acids such as terephthalic acid, their alkyl esters ($C_1$-$C_4$ lower alkyl esters such as monomethyl, monoethyl, dimethyl, diethyl, or dibutyl esters), and/or their acid anhydrides, and may react with the diol component to form a dicarboxylic acid moiety such as a terephthaloyl moiety.

As the dicarboxylic acid component used in the synthesis of the polyesters includes terephthalic acid, the prepared polyester resin can have improved physical properties such as heat resistance, chemical resistance, or weather resistance (e.g., prevention of molecular weight reduction or a yellowing phenomenon by UV).

The dicarboxylic acid component may further include an aromatic dicarboxylic acid, an aliphatic dicarboxylic acid, or a mixture thereof as another dicarboxylic acid component. As used herein, the term "another dicarboxylic acid component" refers to a component excluding terephthalic acid among the dicarboxylic acid components.

Meanwhile, in the polyester copolymer, the dicarboxylic acid component may further include one or more selected from the group consisting of aromatic dicarboxylic acids having 8 to 20 carbon atoms and aliphatic dicarboxylic acids having 4 to 20 carbon atoms.

The aromatic dicarboxylic acid component may include aromatic dicarboxylic acids having 8 to 20 carbon atoms, preferably 8 to 14 carbon atoms, or a mixture thereof and the like. Examples of the aromatic dicarboxylic acid may include isophthalic acid, naphthalene dicarboxylic acids such as 2,6-naphthalenedicarboxylic acid, diphenyl dicarboxylic acid, 4,4'-stilbene dicarboxylic acid, 2,5-furan dicarboxylic acid, 2,5-thiopene dicarboxylic acid, and the like, but specific examples of the aromatic dicarboxylic acid are not limited thereto.

The aliphatic dicarboxylic acid component may include an aliphatic dicarboxylic acid component having 4 to 20 carbon atoms, preferably 4 to 12 carbon atoms, or a mixture thereof and the like. Examples of the aliphatic dicarboxylic acid may include linear, branched, or cyclic aliphatic dicarboxylic acid components, e.g., cyclohexanedicarboxylic acids such as 1,4-cyclohexanedicarboxylic acid and 1,3-cyclohexanedicarboxylic acid, phthalic acid, sebacic acid, succinic acid, isodecyl succinic acid, maleic acid, fumaric acid, adipic acid, glutaric acid, azelaic acid, and the like, but specific examples of the aliphatic dicarboxylic acid are not limited thereto.

Meanwhile, the dicarboxylic acid component may include terephthalic acid in an amount of 50 to 100 mol %, preferably 70 to 100 mol %, and one or more dicarboxylic acids selected from the group consisting of aromatic dicarboxylic acids and aliphatic dicarboxylic acids in an amount of 0 to 50 mol %, preferably 0 to 30 mol %. If the terephthalic acid in the dicarboxylic acid component is present in a very small or excessive amount, the heat resistance, chemical resistance, or weather resistance of the polyester resin may be deteriorated.

The diol component used in the synthesis of the polyesters includes the dianhydrohexitol in an amount of 5 to 60 mol %, cyclohexanedimethanol in an amount of 5 to 80 mol %, and a remaining amount of other diol compounds.

The diol component preferably includes isosorbide (1,4: 3,6-dianhydroglucitol) as the dianhydrohexitol to improve the heat resistance as well as properties of chemical resistance and drug resistance of the prepared polyester resin. Also, as the amount of cyclohexanedimethanol (e.g., 1,2-cyclohexanedimethanol, 1,3-cyclohexanedimethanol, or 1,4-cyclohexanedimethanol) in the diol component is raised, the impact resistance strength of the prepared polyester resin can also surprisingly increase.

In addition to the isosorbide and cyclohexanedimethanol, the diol component may further include other diol components. As used herein, the term "other diol components" refers to a diol component excluding the isosorbide and cyclohexanedimethane, and examples thereof may include aliphatic diols, aromatic diols, or a mixture thereof.

In the polyester copolymer, the diol component may further include one or more selected from the group consisting of compounds of Chemical Formulas 1, 2, and 3:

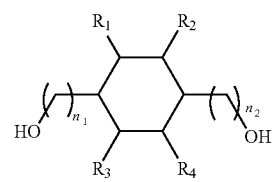

[Chemical Formula 1]

wherein $R_1$, $R_2$, $R_3$, and $R_4$ are each independently hydrogen or a substituted or unsubstituted alkyl group having 1 to 5 carbon atoms, and $n_1$ and $n_2$ are each independently an integer of 0 to 3;

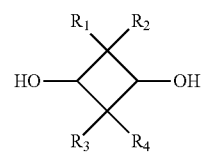

[Chemical Formula 2]

wherein $R_1$, $R_2$, $R_3$, and $R_4$ are each independently hydrogen or a substituted or unsubstituted alkyl group having 1 to 5 carbon atoms; and

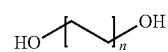

[Chemical Formula 3]

wherein n is an integer of 1 to 7.

As mentioned above, the diol component of the polyester resin may include a dianhydrohexitol in an amount of 5 to 60 mol %. If the amount of dianhydrohexitol in the diol component is less than 5 mol %, the prepared polyester resin may have insufficient heat resistance or chemical resistance and fail to exhibit the melt viscosity of the polyester resin as mentioned above. Also, if the amount of dianhydrohexitol in the diol component exceeds 60 mol %, the appearance properties of the polyester resin or its product may be deteriorated or the yellowing phenomenon may occur.

The polyester copolymer may have a weight average molecular weight of 10,000 to 100,000, and a glass transition temperature of 0 to 200° C.

In addition, the polybutylene terephthalate may have a weight average molecular weight of 10,000 to 150,000.

The polyester resin may be prepared by a method including: esterifying a diol component including 5 to 60 mol % of isosorbide, 5 to 80 mol % of cyclohexanedimethanol, and the remainder of other diol compounds as the dianhydrohexitol with a dicarboxylic acid component including terephthalic acid; adding a phosphorus-based stabilizer to the reaction solution at the time that the esterification is performed at 80% or more; and polycondensing the reaction product of the esterification.

In this preparation method of the polyester resin, a zinc-containing compound is used as a reaction catalyst of the esterification, and a phosphorus-based stabilizer is added to the reaction solution at the end of the esterification, for example, at the time that the esterification is performed at 80% or more, the resultant of the esterification is poly condensed, thereby providing a polyester resin having physical properties such as high heat resistance, flame resistance, and impact resistance as well as good appearance properties, high transparency, and a good molding property.

The details of the dicarboxylic acid component including terephthalic acid, cyclohexanedimethanol, isosorbide, and other diol compounds are the same as described above.

The esterification step may be carried out by the reaction of the dicarboxylic acid component and the diol component at a temperature of 150 to 300° C. under a pressure of 0 to 10.0 kg/cm². The conditions of the esterification may be suitably controlled depending on the specific properties of the polyester to be prepared, the molar ratio of the dicarboxylic acid component and the diol component, or process conditions. Specifically, the esterification may be carried out under the preferable conditions of a pressure of 0 to 5.0 kg/cm², more preferably 0.1 to 3.0 kg/cm², and a temperature of 200 to 270° C., more preferably 240 to 260° C.

The esterification may be carried out in a batch or continuous method, to which each of the raw materials may be added individually or a mixture of a diol component and a dicarboxylic acid component may be preferably added in the form of a slurry. In addition, the diol component such as a dianhydrohexitol being in a solid state at room temperature may be dissolved in water or ethylene glycol and then mixed with the dicarboxylic acid component such as terephthalic acid to form a slurry. Alternatively, the dianhydrohexitol may be melted at a temperature of 60° C. or more and then mixed with the dicarboxylic acid component such as terephthalic acid to form a slurry. Water may further be added to the slurry in which the dicarboxylic acid component and the copolymer diol component such as the dianhydrohexitol and the ethylene glycol that are mixed, thereby facilitating an increase in the fluidity of the slurry.

The molar ratio of the dicarboxylic acid component and the diol component involved in the esterification may range from 1:1.05 to 1:3.0. If the molar ratio of the dicarboxylic acid component and the diol component is less than 1.05, an unreacted dicarboxylic acid component may remain during polymerization to deteriorate the transparency of the resin. If the molar ratio exceeds 3.0, the polymerization rate may be lowered or the productivity of the resin may be deteriorated.

The poly-condensation step of the esterification reaction product may include reacting the esterification reaction product of the dicarboxylic acid component and the diol component for 1 to 24 h at a temperature of 150 to 300° C. under a reduced pressure condition of 600 to 0.01 mmHg.

Such poly-condensation may be carried out at a temperature of 150 to 300° C., preferably 200 to 290° C., more preferably 260 to 280° C. under a reduced pressure condition of 600 to 0.01 mmHg, preferably 200 to 0.05 mmHg, more preferably 100 to 0.1 mmHg. From the application of the reduced pressure condition in the poly-condensation, by-products of the poly-condensation reaction, i.e., glycol, may be removed outside the system. If the poly-condensation is carried out under a reduced pressure condition range departing from 400 to 0.01 mmHg, the removal of by-products may be insufficient.

If the poly-condensation is carried out at a temperature range departing from 150 to 300° C., for example, if the poly-condensation is carried out at a temperature of less than 150° C., it is difficult to remove by-products of the poly-condensation reaction, i.e., glycol, outside the system, by which the intrinsic viscosity of the final reaction product becomes low and the physical properties of the prepared polyester resin are deteriorated, and if the poly-condensation is carried out at a temperature of more than 300° C., the appearance of the prepared polyester resin is highly likely to undergo yellowing. Also, the poly-condensation may be carried out for a time that is required to obtain the intrinsic viscosity of the final reaction product within a suitable level, e.g., for an average detention time of 1 to 24 h.

The preparation method of the polyester resin composition may further include a step of adding a catalyst for the poly-condensation. Such a poly-condensation catalyst may be added to the product of the esterification or transesterification before the initiation of the poly-condensation, it may be added to the mixed slurry including the diol component and the dicarboxylic acid component before the esterification, or it may be added during the esterification.

As the poly-condensation catalyst, a titanium-containing compound, a germanium-containing compound, an antimony-containing compound, an aluminum-containing compound, a tin-containing compound, or a mixture thereof may be used. Examples of the titanium-containing compound and the germanium-containing compound are the same as described above.

The polymer resin composition according to the present invention includes one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer.

The unsaturated nitrile-diene-based rubber-aromatic vinyl graft copolymer may be in the form of a core-shell rubber, may have an average particle diameter of 0.01 to 5 μm and a graft rate of 5 to 90%, and the core may have a glass transition temperature of −20° C. or less and the shell may have a glass transition temperature of 20° C. or more.

The unsaturated nitrile-diene-based rubber-aromatic vinyl graft copolymer is a core-shell rubber obtained by emulsion polymerization or bulk polymerization, may have an average particle diameter of 0.01 to 5 μm and a graft rate of 5 to 90%, and the core may have a glass transition temperature of −20° C. or less and the shell may have a glass transition temperature of 20° C. or more. Optionally, the shell may contain or not contain functional groups such as glycidyl methacrylate or maleic acid anhydride therein.

In the unsaturated nitrile-diene-based rubber-aromatic vinyl graft copolymer, the unsaturated nitrile may be one or more selected from the group consisting of acrylonitrile, methacrylonitrile, ethacrylonitrile, phenyl acrylonitrile, and α-chloroacrylonitrile.

In the graft copolymer, the diene-based rubber may be a butadiene-type rubber or an isoprene-type rubber.

Furthermore, in the graft copolymer, the aromatic vinyl may be one or more selected from the group consisting of styrene, α-methyl styrenevinyl toluene, t-butyl styrene, halogen-substituted styrene, 1,3-dimethyl styrene, 2,4-dimethyl styrene, and ethyl styrene.

The core-shell rubbers may selectively have morphology of a monomodal distribution of which average particle diameter ranges from 0.01 to 5 μm or morphology of a multimodal distribution of which average particle diameter ranges from 0.01 to 5 μm.

The alkylmethaciylate may be one or more selected from the group consisting of methyl methacrylate, ethyl methacrylate, propyl methacrylate, isopropyl methacrylate, and butyl methacrylate.

Preferably, the unsaturated nitrile-diene-based rubber-aromatic vinyl graft copolymer may be an acrylonitrile-butadiene-styrene graft copolymer, and the alkyl methacrylate-diene-based rubber-aromatic vinyl graft copolymer may be a methyl methacrylate-butadiene-styrene graft copolymer. Further, the alkyl methacrylate-silicone/alkyl acrylate graft copolymer may be a methyl methacrylate-silicone/butylacrylate graft copolymer.

The polycarbonate may have a glass transition temperature of 50 to 200° C. and a weight average molecular weight of 10,000 to 200,000.

The polymer resin composition may further include one or more selected from the group consisting of an unsaturated nitrile-aromatic vinyl-glycidyl methacrylate-based compatibilizer, an unsaturated nitrile-aromatic vinyl-maleic anhydride-based compatibilizer, a saturated ethylene-alkylacrylate-glycidyl methacrylate-based compatibilizer, and a carbodiimide-based anti-hydrolysis agent.

In this case, the unsaturated nitrile-aromatic vinyl-glycidyl methacrylate-based compatibilizer may be included in an amount of 15% by weight or less, the unsaturated nitrile-aromatic vinyl-maleic anhydride-based compatibilizer may be included in an amount of 15% by weight or less, the saturated ethylene-alkylacrylate-glycidyl methacrylate-based compatibilizer may be included in an amount of 15% by weight or less, and the carbodiimide-based anti-hydrolysis agent may be included in an amount of 10% by weight or less.

The alkylacrylate may be one or more selected from the group consisting of methyl acrylate, ethyl acrylate, propyl acrylate, isopropyl acrylate, butyl acrylate, hexyl acrylate, octyl acrylate, and 2-ethyl hexyl acrylate.

The unsaturated nitrile-aromatic vinyl-glycidyl methacrylate-based compatibilizer may have a glass transition temperature of 20 to 200° C. and a weight average molecular weight of 200 to 300,000, and may be selectively replaced with an aromatic vinyl-glycidyl methacrylate.

The unsaturated nitrile-aromatic vinyl-maleic anhydride-based compatibilizer may have a glass transition temperature of 20 to 200° C. and a weight average molecular weight of 200 to 300,000, and the saturated ethylene-alkylacrylate-glycidyl methacrylate-based compatibilizer may have a glass transition temperature of −150 to 200° C. and a weight average molecular weight of 200 to 300,000.

The carbodiimide-based anti-hydrolysis agent may have a weight average molecular weight of 50 to 300,000, and may be represented by the following Chemical Formula 4 or 5.

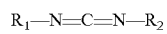  [Chemical Formula 4]

Herein, $R_1$ and $R_2$ are each independently hydrogen, an alkyl group having 1 to 20 carbon atoms, or aryl group having 6 to 36 carbon atoms.

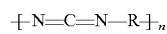  [Chemical Formula 5]

Herein, R is an alkyl group having 1 to 20 carbon atoms or an aryl group having 6 to 36 carbon atoms, and n is an integer of 2 to 30,000 which indicates an average degree of polymerization.

The polymer resin composition may include: one or more additives selected from the group consisting of an antioxidant, a lubricant, a light stabilizer, a light absorber, an transesterification inhibitor, and an anti-hydrolysis agent in an amount of 10% by weight or less, based on the total basic resin consisting of a polyester copolymer including a residue of a dicarboxylic acid component containing terephthalic acid and a residue of a diol component containing dianhydrohexitol; and one or more copolymers selected from the group consisting of an unsaturated nitrile-diene-based rubber-aromatic vinyl graft copolymer, an alkyl methacrylate-diene-based rubber-aromatic vinyl graft copolymer, and an alkyl methacrylate-silicone/alkyl acrylate graft copolymer.

The hindered phenol-based antioxidant may have a weight average molecular weight of 50 to 300,000.

In addition, the phosphite-based antioxidant may be selected from the group consisting of the following Chemical Formulas 6, 7, and 8.

[Chemical Formula 6]

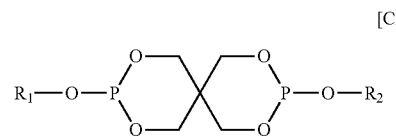

Herein, $R_1$ and $R_2$ are each independently a substituted or unsubstituted alkyl group having 1 to 40 carbon atoms, or a substituted or unsubstituted aryl group having 6 to 40 carbon atoms.

[Chemical Formula 7]

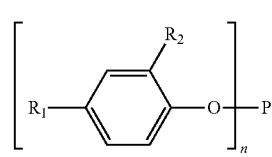

Herein, $R_1$ and $R_2$ are each independently a substituted or unsubstituted alkyl group having 1 to 40 carbon atoms or a substituted or unsubstituted awl group having 6 to 40 carbon atoms, and n is an integer of 1 or more which indicates the repeating unit of substitution

[Chemical Formula 8]

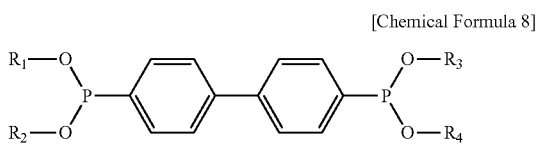

Herein, $R_1$, $R_2$, $R_3$, and $R_4$ are each independently a substituted or unsubstituted alkyl group having 1 to 40 carbon atoms, or a substituted or unsubstituted awl group having 6 to 40 carbon atoms.

On the other hand, the thioester-based antioxidant may be a compound represented by the following Chemical Formula 9 or 10.

[Chemical Formula 9]

[Formula 10]

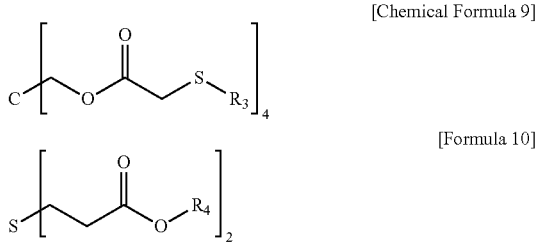

Herein, $R_3$ and $R_4$ are each independently a substituted or unsubstituted alkyl group having 1 to 40 carbon atoms, or a substituted or unsubstituted aryl group having 6 to 40 carbon atoms.

The lubricant may be one or more selected from the group consisting of a metal stearate-based lubricant, an amide-based lubricant, a paraffin-based lubricant, and an ester-based lubricant.

The light stabilizer and the light absorber may be a hindered amine-based light stabilizer (HALS), a benzotriazol-based light absorber or a benzophenone-based light absorber.

Meanwhile, the transesterification inhibitor may be a phosphorous compound having at least hydroxyl functional group and an alkyl ester functional group, and a hydrazine compound having a unit represented by the following Chemical Formula 11.

[Chemical Formula 11]

The polymer resin composition according to the present invention may further include an additive selected from the group consisting of a chain extender having a unit of glycidyl methacrylate or a coupling agent, an inorganic additive, a filling agent, a dye, a pigment, and a coloring agent.

Hereinafter, the present invention will be described in detail through specific examples. However, it should be understood that the present invention is not restricted by these examples.

Example 1

0.5 wt % of acrylonitrile-styrene-glycidyl methacrylate, 0.2 wt % of a phenolic primary antioxidant, and 0.2 wt % of a phosphite-based secondary antioxidant were added, based on 100 wt % of a resin consisting of 60 wt % of a terephthalic acid-isosorbide-1,4-cyclohexanediol-ethylene glycol copolymer polyester (Tg: 120° C., weight average molecular weight: 50,000), 10 wt % of an acrylonitrile-butadiene-styrene graft copolymer, 5 wt % of a methyl methacrylate-butadiene-styrene graft copolymer, and 25 wt % of a polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was HR-181 which is the graft ABS product in the form of a core-shell rubber available from Kumho Petrochemical (Korea), the methyl methacrylate-butadiene-styrene graft copolymer was M-511 which is the graft MBS product in the form of a core-shell rubber available from KANEKA Corporation (Japan), the polycarbonate was 3022PJ available from Samyang Corporation (Korea), the acrylonitrile-styrene-glycidyl methacrylate was SAG-005 available from SUNNY FC (China), the phenolic primary antioxidant was AO-60 available from ADEKA Corporation (Japan), and the phosphite-based secondary antioxidant was S-9228 available from DOVER Chemical Corp (USA).

Example 2

0.5 wt % of acrylonitrile-styrene-glycidyl methacrylate, 0.2 wt % of a phenolic primary antioxidant, and 0.2 wt % of a phosphite-based secondary antioxidant were added, based on 100 wt % of a resin consisting of 50 wt % of a terephthalic acid-isosorbide-1,4-cyclohexanediol-ethylene glycol copolymer polyester (Tg: 120° C., weight average molecular weight: 50,000), 15 wt % of an acrylonitrile-butadiene-styrene graft copolymer, and 35 wt % of a polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was HR-181 which is the graft ABS product in the form of a core-shell rubber available from Kumho Petrochemical (Korea), the methyl methacrylate-butadiene-styrene graft copolymer was M-511 which is the graft MBS product in the form of a core-shell rubber available from KANEKA Corporation (Japan), the polycarbonate was 3025PJ available from Samyang Corporation (Korea), the acrylonitrile-styrene-glycidyl methacrylate was SAG-005 available from SUNNY FC (China), the phenolic primary antioxidant was AO-60 available from ADEKA Corporation (Japan), and the phosphite-based secondary antioxidant was Irgafos 168 available from Clariant (Switzerland).

Example 3

0.5 wt % of acrylonitrile-styrene-glycidyl methacrylate, 0.2 wt % of a phenolic primary antioxidant, and 0.2 wt % of a phosphite-based secondary antioxidant were added, based on 100 wt % of a resin consisting of 40 wt % of a terephthalic acid-isosorbide-1,4-cyclohexanediol-ethylene glycol copolymer polyester (Tg: 110° C., weight average molecular weight: 55,000), 15 wt % of an acrylonitrile-butadiene-styrene graft copolymer, and 45 wt % of a polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was HR-181 which is the graft ABS product in the form of a core-shell rubber available from Kumho Petrochemical (Korea), the methyl methacrylate-butadiene-styrene graft copolymer was M-511 which is the graft MBS product in the form of a core-shell rubber available from KANEKA Corporation (Japan), the polycarbonate was 3025PJ available from Samyang Corporation (Korea), the acrylonitrile-styrene-glycidyl methacrylate was SAG-005 available from SUNNY FC (China), the phenolic primary antioxidant was AO-60 available from ADEKA Corporation (Japan), and the phosphite-based secondary antioxidant was Irgafos 168 available from Clariant (Switzerland).

Example 4

0.5 wt % of acrylonitrile-styrene-glycidyl methacrylate, 0.2 wt % of a phenolic primary antioxidant, and 0.2 wt % of a phosphite-based secondary antioxidant were added, based on 100 wt % of a resin consisting of 22 wt % of a terephthalic acid-isosorbide-1,4-cyclohexanediol-ethyleneglycol copolymer polyester (Tg: 110° C., weight average molecular weight: 55,000), 10 wt % of an acrylonitrile-butadiene-styrene graft copolymer, 10 wt % of polybutylene terephthalate, 3 wt % of a styrene-ethylene-butylene-styrene block copolymer, and 55 wt % of a polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was HR-181 which is the graft ABS product in the form of a core-shell rubber available from Kumho Petrochemical (Korea), the polybutylene terephthalate was 1200-211M available from Chang Chun Plastics (Taiwan), the styrene-ethylene-butylene-styrene block copolymer was H-1052 available from Asahi Kasei Corporation (Japan), the polycarbonate was 3030PJ available from Samyang Corporation (Korea), the acrylonitrile-styrene-glycidyl methacrylate was SAG-005 available from SUNNY FC (China), the phenolic primary antioxidant was AO-60 available from ADEKA Corporation (Japan), and the phosphite-based secondary antioxidant was S-9228 available from DOVER Chemical Corp. (USA).

Example 5

0.5 wt % of acrylonitrile-styrene-glycidyl methacrylate, 0.2 wt % of a phenolic primary antioxidant, and 0.2 wt % of a phosphite-based secondary antioxidant were added, based on 100 wt % of a resin consisting of 24 wt % of a terephthalic acid-isosorbide-1,4-cyclohexanediol-ethyleneglycol copolymer polyester (Tg: 110° C., weight average molecular weight: 55,000), 10 wt % of an acrylonitrile-butadiene-styrene graft copolymer, 13 wt % of polybutylene terephthalate, 3 wt % of a styrene-ethylene-butylene-styrene block copolymer, and 50 wt % of a polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was HR-181 which is the graft ABS product in the form of a core-shell rubber available from Kumho Petrochemical (Korea), the polybutylene terephthalate was 1200-211M available from Chang Chun Plastics (Taiwan), the styrene-ethylene-butylene-styrene block copolymer was H-1052 available from Asahi Kasei Corporation (Japan), the polycarbonate was 3030PJ available from Samyang Corporation (Korea), the acrylonitrile-styrene-glycidyl methacrylate was SAG-005 available from SUNNY FC (China), the phenolic primary antioxidant was AO-60 available from ADEKA Corporation (Japan), and the phosphite-based secondary antioxidant was S-9228 available from DOVER Chemical Corp (USA).

Example 6

0.5 wt % of acrylonitrile-styrene-glycidyl methacrylate, 0.5 wt % of a carbodiimide-based anti-hydrolysis agent, 0.2 wt % of a phenolic primary antioxidant, and 0.2 wt % of a phosphite-based secondary antioxidant were added, based on 100 wt % of a resin consisting of 14 wt % of a terephthalic acid-isosorbide-1,4-cyclohexanediol-ethyleneglycol copolymer polyester (Tg: 110° C., weight average molecular weight: 55,000), 13 wt % of an acrylonitrile-butadiene-styrene graft copolymer, 15 wt % of polybutylene terephthalate, 3 wt % of a styrene-ethylene-butylene-styrene block copolymer, and 55 wt % of a polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was HR-181 which is the graft ABS product in the form of a core-shell rubber available from Kumho Petrochemical (Korea), the polybutylene terephthalate was 1200-211M available from Chang Chun Plastics (Taiwan), the styrene-ethylene-butylene-styrene block copolymer was H-1052 available from Asahi Kasei Corporation (Japan), the polycarbonate was 3030PJ available from Samyang Corporation (Korea), the acrylonitrile-styrene-glycidyl methacrylate was SAG-005 available from SUNNY FC (China), the phenolic primary antioxidant was AO-60 available from ADEKA Corporation (Japan), and the phosphite-based secondary antioxidant was S-9228 available from DOVER Chemical Corp (USA).

Example 7

0.5 wt % of acrylonitrile-styrene-glycidyl methacrylate, 0.2 wt % of a phenolic primary antioxidant, and 0.2 wt % of a phosphite-based secondary antioxidant were added, based on 100 wt % of a resin consisting of 10 wt % of a terephthalic acid-isosorbide-1,4-cyclohexanediol-ethyleneglycol copolymer polyester (Tg: 110° C., weight average molecular weight: 55,000), 10 wt % of an acrylonitrile-butadiene-styrene graft copolymer, 18 wt % of polybutylene terephthalate, 2 wt % of a styrene-ethylene-butylene-styrene block copolymer, and 60 wt % of a polycarbonate, and kneading extrusion was uniformly carried out using a twin-screw kneading extruder (Φ: 40 mm, L/D=40) so as to prepare a pellet.

In this regard, the terephthalic acid-isosorbide-1,4-cyclohexanediol-ethylene glycol copolymer polyester was an environmentally friendly resin having high impact resistance, ECOZEN available from SK Chemicals (Korea), the acrylonitrile-butadiene-styrene graft copolymer was HR-181 which is the graft ABS product in the form of a core-shell rubber available from Kumho Petrochemical (Korea), the polybutylene terephthalate was 1200-211M available from Chang Chun Plastics (Taiwan), the styrene-ethylene-butylene-styrene block copolymer was H-1052 available from Asahi Kasei Corporation (Japan), the polycarbonate was 3030PJ available from Samyang Corporation (Korea), the acrylonitrile-styrene-glycidyl methacrylate was SAG-005 available from SUNNY FC (China), the phenolic primary antioxidant was AO-60 available from ADEKA Corporation (Japan), and the phosphite-based secondary antioxidant was Irgafos 168 available from Clariant (Switzerland).

Comparative Example 1 to 5

Conventional ABS and PC/ABS products were used for comparison as described below.

Comparative Example 1

ABS product having a high load (1.82 MPa) and a heat resistance temperature of 95° C.

Comparative Example 2

ABS product having a high load (1.82 MPa) and a heat resistance temperature of 100° C.

Comparative Example 3

PC/ABS product having a polycarbonate content of 50%

Comparative Example 4

PC/ABS product having a polycarbonate content of 60%

Comparative Example 5

PC/ABS product having a polycarbonate content of 70%

Experimental Example: Measurement of Physical Properties of Molded Parts Manufactured from Polymer Resin Composition Each of pellets prepared in Examples 1 to 7 and Comparative Examples 1 to 5 were injected at a temperature of 250° C. using an injection molding machine in the same manner, the injected samples were subjected to conditioning under the conditions of 23±2° C. and relative humidity 50±5%, and then the mechanical properties thereof were measured according to the following methods. The results thereof are shown in Tables 1 to 3 below.

Experimental Example 1: Measurement of Impact Strength

The samples for testing were prepared and measured for their impact strength using an Izod Impact Tester (Toyoseiki) in accordance with ASTM D 256.

Experimental Example 2: Measurement of Tensile Properties

The samples for testing were prepared and measured for their tensile strength and elongation using a Universal Testing Machine (Zwick Roell Z010) in accordance with ASTM D 638.

Experimental Example 3: Measurement of Flexural Properties

The samples for testing were prepared and measured for their flexural strength and flexural elasticity modulus using a Universal Testing Machine (Zwick Roell Z010) in accordance with ASTM D 790.

Experimental Example 4: Measurement of Heat Resistance

The samples for testing were prepared and measured for their heat resistance using a heat distortion temperature (HDT) tester (Toyoseiki) in accordance with ASTM D 648.

Experimental Example 5: Measurement of Chemical Resistance of Molded Parts Manufactured from Polymer Resin Composition Each of pellets prepared in Examples 1 to 7 and Comparative Examples 1 to 5 were injected at a temperature of 250° C. using an injection molding machine in the same manner, the injected samples for testing tensile strength were subjected to conditioning for 24 h under the conditions of 23±2° C. and relative humidity 50±5%, and then the test was conducted according to the following methods.

① The tensile test samples were fixed in a chemical resistance test fixture in which a critical amount of deformation was set to 2.2%.

② The tensile test samples were applied with a blend of aromatic/aliphatic chemical reagents or a UV absorber for 1 min and then left at 23±2° C. for 72 h.

③ After lapse of time at 23±2° C. of 72 h, the tensile strengths before and after the test were measured to calculate a tensile strength loss (%), from which chemical resistances thereof were evaluated and compared.

Tensile Strength loss (%)=[(Tensile Strength before Test−Tensile Strength after Test)/Tensile Strength before Test]×100     [Equation 1]

In the above, the blend of aromatic/aliphatic chemicals was characterized by including 10 to 90% by weight of ethanol, and further including one or more selected from the group consisting of the following adjunctive components.

Adjunctive Components: aliphatic and aromatic alcohols, aliphatic and aromatic esters, aromatic aldehydes, unsaturated hydrocarbons, saturated hydrocarbons, aliphatic amines, aliphatic diamines, and terpenes.

However, in the case of the polyol base, only aliphatic amines or diamines were included as the adjunctive component. Also, the UV screening agent adopted was a product being generally distributed in the art.

TABLE 1

|  | Unit | Examples | | | | |
|---|---|---|---|---|---|---|
|  |  | 1 | 2 | 3 | 4 | 5 |
| Izod Impact Strength (1/8") | J/m | 850 | 830 | 840 | 820 | 750 |
| Izod Impact Strength (1/4") | J/m | 650 | 630 | 640 | 655 | 700 |
| Tensile Strength | kg/cm$^2$ | 530 | 535 | 525 | 535 | 520 |
| Elongation | % | 135 | 145 | 135 | 120 | 115 |
| Heat Resistance (1.82 MPa) | ° C. | 108 | 110 | 107 | 104 | 102 |
| Flexural Strength | kg/cm$^2$ | 780 | 800 | 770 | 810 | 820 |
| Flexural Elasticity Modulus | kg/cm$^2$ | 19,400 | 19,500 | 19,300 | 21,000 | 21,500 |
| Resistance to Chemicals |  | Results | | | | |
| Tensile Strength Loss (%) ① |  | 6 | 7 | 8 | — | — |
| ② |  | — | — | — | 25 | 11 |
| ③ |  | — | — | — | 18 | 10 |

①: Blend of polyol-based aliphatic amines or diamines
②: Blend of alcohol-based aromatic/aliphatic chemicals
③: UV screening agent

TABLE 2

| Classification | Unit | Example | |
|---|---|---|---|
|  |  | 6 | 7 |
| Izod Impact Strength (1/8") | J/m | 760 | 780 |
| Izod Impact Strength (1/4") | J/m | 710 | 720 |
| Tensile Strength | kg/cm$^2$ | 525 | 530 |
| Elongation | % | 125 | 135 |
| Heat Resistance (1.82 MPa) | ° C. | 100 | 100 |
| Flexural Strength | kg/cm$^2$ | 830 | 835 |
| Flexural Elasticity Modulus | kg/cm$^2$ | 21,200 | 22,000 |
| Resistance to Chemicals |  | Results | |
| Tensile Strength Loss (%) ① |  | — | — |
| ② |  | 3 | 3 |
| ③ |  | 8 | 0.5 |

①: Blend of polyol-based aliphatic amines or diamines
②: Blend of alcohol-based aromatic/aliphatic chemicals
③: UV screening agent

TABLE 3

| Classification | Unit | Comparative Example | | | | |
|---|---|---|---|---|---|---|
|  |  | 1 | 2 | 3 | 4 | 5 |
| Izod Impact Strength (1/8") | J/m | 250 | 240 | 600 | 550 | 650 |
| Izod Impact Strength (1/4") | J/m | 210 | 180 | 500 | 450 | 550 |
| Tensile Strength | kg/cm$^2$ | 470 | 475 | 440 | 550 | 550 |
| Elongation | % | 20 | 20 | 110 | 100 | 105 |
| Heat Resistance (1.82 MPa) | ° C. | 95 | 100 | 100 | 105 | 110 |
| Flexural Strength | kg/cm$^2$ | 630 | 650 | 600 | 780 | 780 |
| Flexural Elasticity Modulus | kg/cm$^2$ | 21,000 | 21,500 | 17,000 | 22,000 | 22,000 |
| Resistance to Chemicals |  | Results | | | | |
| Tensile Strength Loss (%) ① |  | — | — | 25 | 35 | 33 |
| ② |  | 57 | 55 | 50 | 35 | 52 |
| ③ |  | 62 | 60 | 53 | 60 | 55 |

①: Blend of polyol-based aliphatic amines or diamines
②: Blend of alcohol-based aromatic/aliphatic chemicals
③: UV screening agent As can be seen in the above measurement results, the examples exhibited superior heat resistance and impact resistance as compared with the comparative examples. Thereby, the polymer resin compositions according to the present invention were environmentally friendly compositions, and had improved physical properties of heat resistance and impact resistance, as well as good resistance to environmental stress cracking.

The present invention has been described in detail with reference to the specific embodiments. However, it will be apparent to a person skilled in the art that the detailed description is given for the purpose of illustrating preferred embodiments and the scope of the present invention is not limited thereto. Therefore, the substantial scope of the present invention is to be defined by the appended claims and equivalents thereof.

What is claimed is:
1. A polymer resin composition comprising:
   a resin, comprising:
      between about 5% and about 90% by weight of a polyester copolymer, the polyester copolymer including a residue of a dicarboxylic acid component and a residue of a diol component, wherein the dicarboxylic acid component contains terephthalic acid, and wherein the diol component consists of isosorbide, 1,4-cyclohexanediol, and ethylene glycol;
      between about 1% and about 50% by weight of one or more copolymers selected from the group consisting of an unsaturated nitrile-diene-based rubber-aro- matic vinyl graft copolymer, an alkyl methacrylate-diene-based rubber-aromatic vinyl graft copolymer, and an alkyl methacrylate-silicone/alkyl acrylate graft copolymer;

between about 5% and about 90% by weight polycarbonate;

between about 1% and about 30% by weight of polybutylene terephthalate;

between about 1% and about 20% by weight of a styrene-ethylene-butylene-styrene block copolymer; and 15% by weight or less of one or more compatibilizers selected from the group consisting of an unsaturated nitrile-aromatic vinyl-glycidyl methacrylate-based compatibilizer and an unsaturated nitrile-aromatic vinyl-maleic anhydride-based compatibilizer, wherein each of the one or more compatibilizers has a weight average molecular weight of between about 200 and about 300,000, the polymer resin composition having a tensile strength loss defined in the following Equation 1 ranging from 0.5 to 30%:

Tensile Strength Loss (%)=[(Tensile Strength before Test−Tensile Strength after Test)/Tensile Strength before Test]×100.  [Equation 1]

2. The polymer resin composition according to claim 1, wherein the polyester copolymer has a weight average molecular weight of 10,000 to 100,000, and a glass transition temperature of 0 to 200° C.

3. The polymer resin composition according to claim 1, wherein the unsaturated nitrile-diene-based rubber-aromatic vinyl graft copolymer is in the form of a core-shell rubber and has an average particle diameter of 0.01 to 5 μm and a graft rate of 5 to 90%, and the core has a glass transition temperature of −20° C. or less and the shell has a glass transition temperature of 20° C. or more.

4. The polymer resin composition according to claim 1, wherein in the unsaturated nitrile-diene-based rubber-aromatic vinyl graft copolymer, the unsaturated nitrile is one or more selected from the group consisting of acrylonitrile, methacrylonitrile, ethacrylonitrile, phenyl acrylonitrile, and a-chloroacrylonitrile.

5. The polymer resin composition according to claim 1, wherein in the graft copolymer, the diene-based rubber is a butadiene-type rubber or an isoprene-type rubber.

6. The polymer resin composition according to claim 1, wherein in the graft copolymer, the aromatic vinyl is one or more selected from the group consisting of styrene, a-methyl styrenevinyl toluene, t-butyl styrene, halogen-substituted styrene, 1,3-dimethyl styrene, 2,4-dimethyl styrene, and ethyl styrene.

7. The polymer resin composition according to claim 1, wherein the unsaturated nitrile-diene-based rubber-aromatic vinyl graft copolymer is an acrylonitrile-butadiene-styrene graft copolymer.

8. The polymer resin composition according to claim 1, wherein the alkyl methacrylate-diene-based rubber-aromatic vinyl graft copolymer is a methyl methacrylate-butadiene-styrene graft copolymer.

9. The polymer resin composition according to claim 1, wherein the alkyl methacrylate-silicone/alkyl acrylate graft copolymer is a methyl methacrylate-silicone/butylacrylate graft copolymer.

10. The polymer resin composition according to claim 1, wherein the polycarbonate has a glass transition temperature of 50 to 200° C., and a weight average molecular weight of 10,000 to 200,000.

11. The polymer resin composition according to claim 1, wherein the polymer resin composition further comprises a carbodiimide-based anti-hydrolysis agent.

12. The polymer resin composition according to claim 1, wherein the polymer resin composition further comprises a carbodiimide-based anti-hydrolysis agent.

13. The polymer resin composition according to claim 1, wherein the polymer resin composition comprises one or more additives selected from the group consisting of an antioxidant, a lubricant, a light stabilizer, a light absorber, a transesterification inhibitor, and an anti-hydrolysis agent.

* * * * *